Oct. 4, 1938.    J. R. YANCEY    2,132,199
WELL HEAD INSTALLATION WITH CHOKE VALVE
Filed Oct. 12, 1936    3 Sheets-Sheet 1
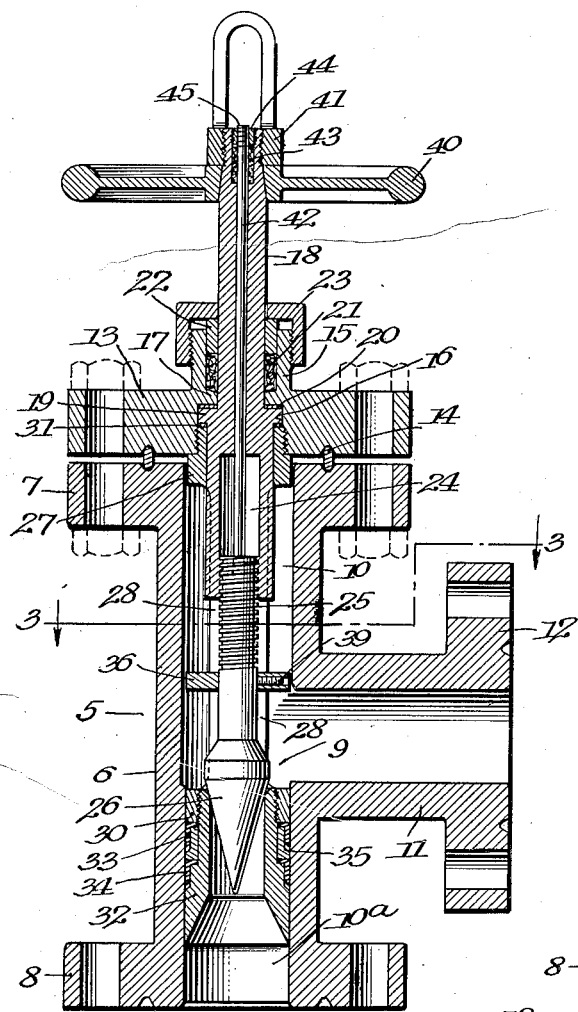
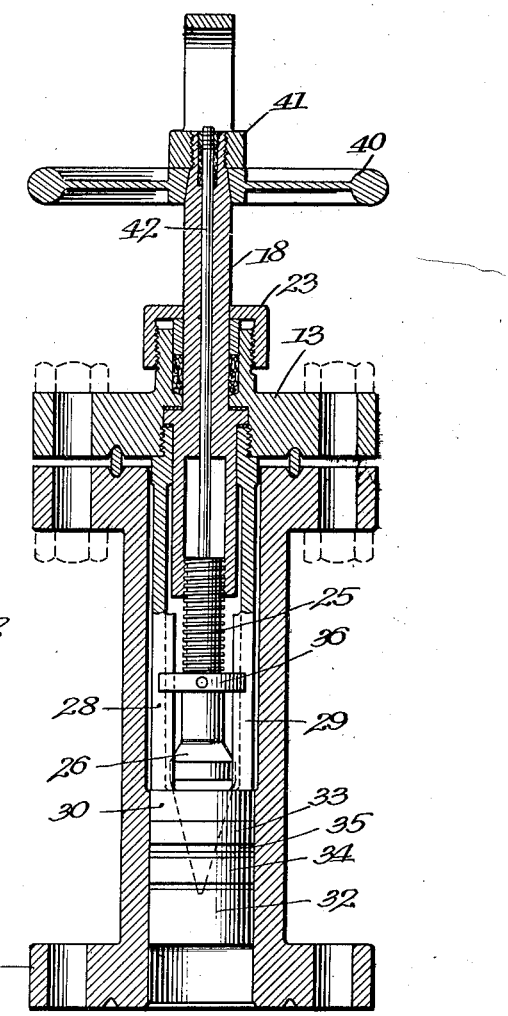
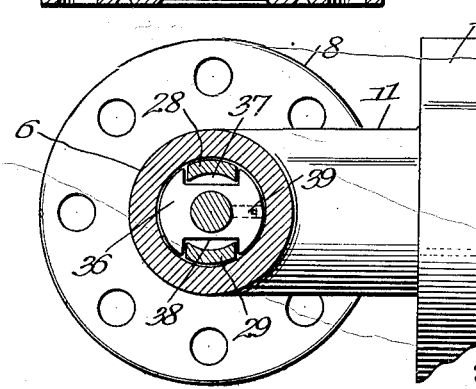
Inventor
John R. Yancey Oct. 4, 1938.　　　　J. R. YANCEY　　　　2,132,199
WELL HEAD INSTALLATION WITH CHOKE VALVE
Filed Oct. 12, 1936　　　3 Sheets-Sheet 2

Inventor
John R. Yancey
By Cushman, Darby & Cushman
Attorneys

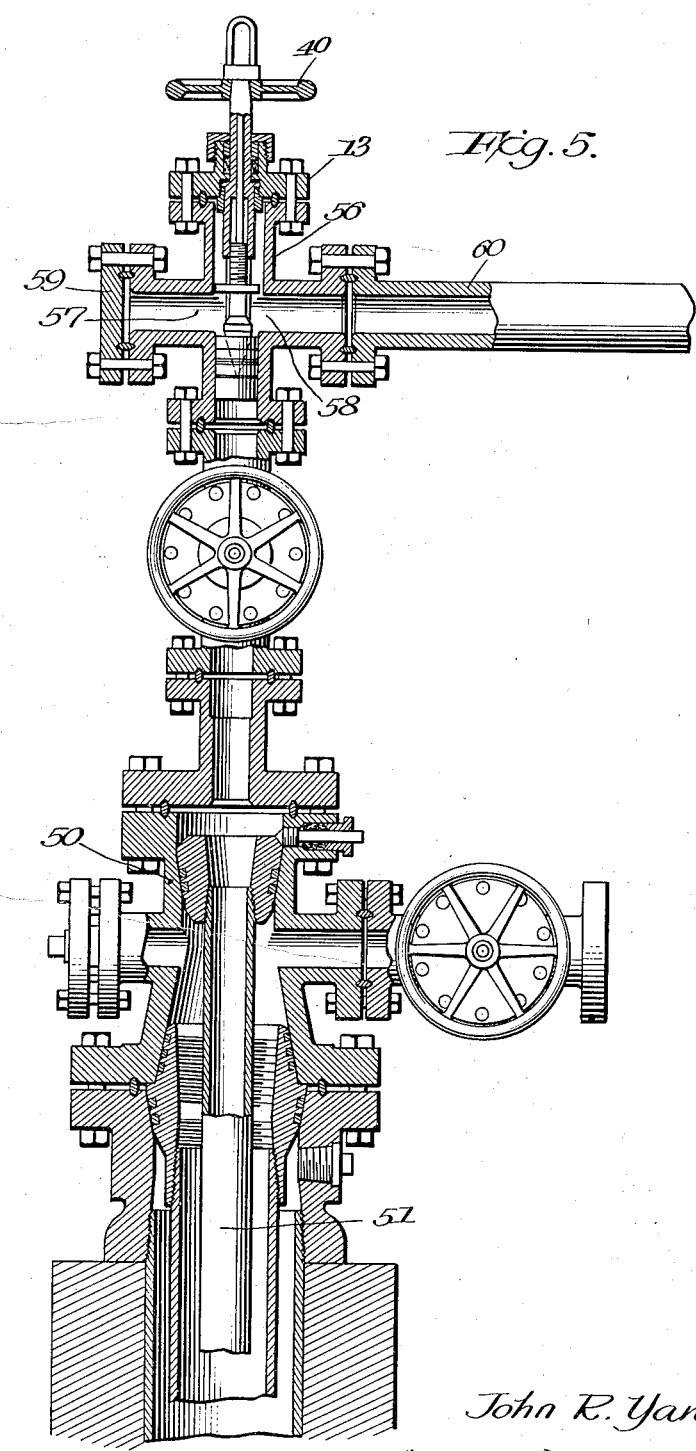

Patented Oct. 4, 1938

2,132,199

UNITED STATES PATENT OFFICE 2,132,199

WELL HEAD INSTALLATION WITH CHOKE VALVE

John R. Yancey, Houston, Tex., assignor to Gray Tool Company, Houston, Tex., a corporation of Texas Application October 12, 1936, Serial No. 105,315

6 Claims. (Cl. 166—15)

The present invention has as its object to provide a well head installation having control means including a choke valve so constructed and arranged as to be readily adaptable to different conditions and operations.

The invention is shown in illustrative embodiment in the accompanying drawings in which Figure 1 is an axial section of one form of choke valve which is utilizable in the installation;

Figure 2 is an axial section of the valve taken at right angles to the section of Figure 1;

Figure 3 is a section substantially on the line 3—3 of Figure 1;

Figure 5 is a section similar to that of Figure 4, but showing a different form of valve body.

Figure 4:
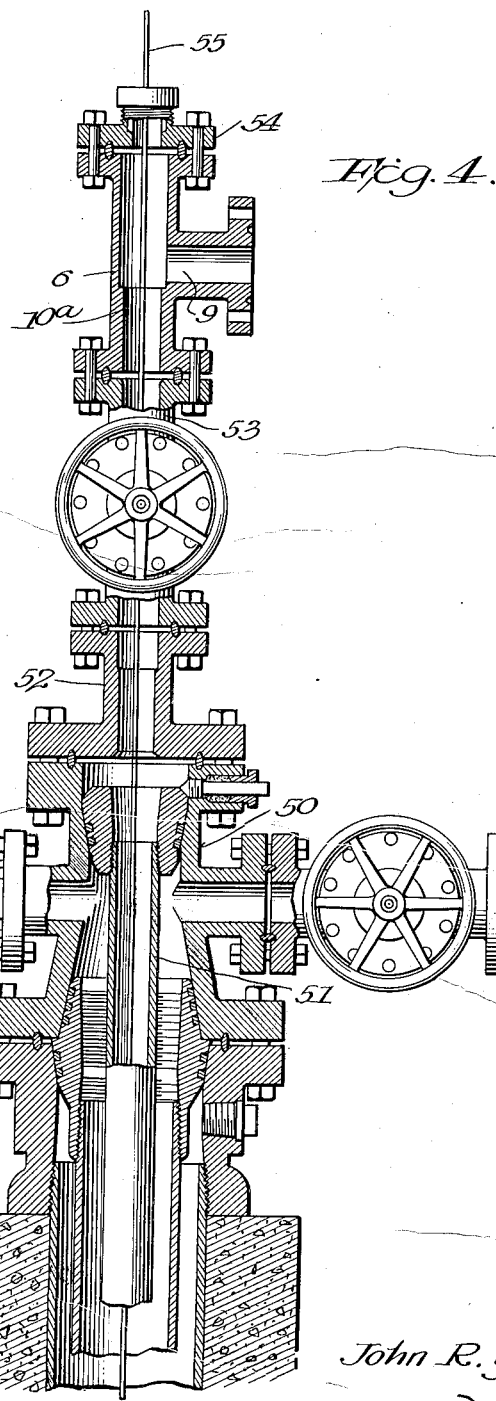
Figure 4 is an axial section of a well head installation including the valve body of the preceding figures but in a different adaptation.

Referring to the drawings, reference numeral 5 designates generally a body comprising the main substantially cylindrical portion 6 with the upper and lower end coupling flanges 7 and 8. The portion 6 is provided with the lateral port 9 communicating with its internal cylindrical passage or cavity 10, the port being externally necked as at 11, the neck having at its outer extremity a coupling flange 12. The described body has, as a whole, the form of a T.

A cap 13 includes a flange adapted to be bolted to the flange 7, a packing ring 14 being interposed between the two. The cap includes an outwardly projecting tubular neck 15 which is coaxial with opening 10 of the valve body and has a bore 16 coaxial with neck 15. The neck opening and the bore 16 are separated by an annular rib 17.

A stem 18 projects through the neck 15 and has a shoulder portion 19 positioned in bore 16, a thrust washer 20 being interposed between the shoulder and rib 17. A packing 21 is interposed between the neck and stem and is compressed by the gland ring 22 and nut 23, the latter having a skirt threaded on neck 15.

The inner end of stem 18 is provided with an axial bore 24 whose extremity is threaded and engages the threaded shank portion 25 of a needle 26.

Threaded in bore 16 is the neck portion 27 of a yoke which includes a pair of inwardly extending arms 28 and 29, these extending in parallel relation and being joined at their inner extremities by a ring 30 which fits in the slightly reduced portion 10a of the body opening just beyond port 9, that is, between the latter and the opposite end of the body from cap 13. The ring 30 has an internal diameter somewhat larger than the maximum diameter of the needle 26. As shown, the neck portion 27 is shouldered so as to abut the cap 13 and a thrust washer 31 is interposed between the neck extremity and the shoulder 19 of the valve stem.

A tubular fitting 32 is externally reduced to receive packing provisions in the form of spring cups 33 and 34, a spacer ring 35 also assisting in the proper positioning of the cups. The fitting 32 has an externally threaded end engaged with the internal threads of ring 30, the inner extremity of the fitting providing a seat for cooperation with the conical tip of the needle 26.

The arms 28 and 29 may be of arcuate section as shown in Figure 3 and their lateral edges are parallel. A plate or cross head 36 has recesses 37 and 38 which receive the arms 28 and 29, the recesses having parallel end walls which have a sliding fit with the arms. The cross head is centrally apertured to receive the shank portion 25 of the needle and is secured thereto, below the threads, by means of the set screw 39. With the needle seated as shown in Figure 1, the cross head is level with or above the top of port 9 so as to be out of the line of flow between the latter and passage portion 10a. The cross head substantially closes the passage 10 above the port 9.

The stem 18 has a hand wheel 40 secured to its upper end by means of a guard nut 41. When the hand wheel is turned, it rotates always in the same plane since the stem is non-rising. Such rotation, however, effects axial movement of the needle 26 since the latter is held against rotation by means of the cross head 36 coacting with arms 28 and 29.

It will be evident that cap 13 carries the needle, the seat for the needle, and the actuating means for the needle so that all these parts are separable as a unit from the valve body.

A rod 42 is threaded in an axial bore in the upper end of the shank portion 25 and is slidable in an axial bore of stem 18. The upper end of the bore in stem 18 is counterbored and receives packing material 43 and a gland nut 44, the upper end of rod 42 being at the top or above the top of stem 18 when the needle 26 is in its lowermost position. The upper end of rod 42 is provided with graduations 45 and these, when viewed in connection with the top of the gland nut, enable the operator to know the exact position of the needle since the movement of the latter is directly communicated to rod 42.

In the well head installation shown in Figure 4, reference numeral 50 designates the portion by which the tubing line 51 is supported. Reference numeral 52 designates an adapter secured to the top of portion 50, the adapter being surmounted by a shut-off valve, shown as a gate valve having a body 53, the gate of the valve being entirely out of the flow passage when in open position. The valve body 6, previously described, is secured to the top of the body 53 and as shown in Figure 4, the cap 13, together with the parts carried thereby, has been removed and replaced by a fitting shown as a cap 54 provided with packing means for a wire line 55 to the lower end of which any desired implement may be secured for carrying out operations in the tubing line. The passage 10a in the body 6 has the same diameter as the port 9, which diameter is the same as the internal diameter of the tubing 51, the adapter 52 and the valve body 53. Consequently, any tool which the tubing line will take may be passed thereto through the superimposed elements when the shut-off valve is opened.

In making proration tests, it is sometimes desired to have a flow line above the tubing line which has exactly the same flow capacity as the latter. Under such circumstances, the cap 54 may be replaced by a solid closure cap, flow, of course, being controlled by the gate valve. The latter is closed while the choke valve is being changed for its various uses.

Figure 5 shows the same installation as Figure 4 except that the body 56 of the choke valve is in the form of a cross instead of a T and has the two diametrically opposite coaxial ports 57 and 58. The same cap 13, together with the elements carried thereby, is applied to the body 56 to control flow through the ports. The port 57 is shown as being closed by a cap 59, flow taking place through a single side line 60. When dual control is required, and with the shut-off valve closed, the cap 13 is removed and replaced by a closure cap, such as 59, the latter being removed and replaced by another side line such as is shown at 60, both side lines being provided with chokes. When the shut-off valve is then opened, flow may be controlled in the side flow lines. The various passages are of the same size and all operations described with reference to Figure 4, may be carried out with the installation of Figure 5.

It will be understood that the invention is not limited in embodiment to devices of the exact form and arrangement shown in the drawings and I do not limit myself in these respects except as in the following claims.

I claim:—

1. A valve comprising a body having a through passage and a side port communicating with said passage, a cap closing the upper end of said passage, a non-rising stem rotatably carried by said cap, a pair of parallel arms carried by said cap and extending into said passage, an internally threaded ring carried by the inner ends of said arms, a valve seat threaded in said ring and positioned between the lower end of said passage and said port, a needle cooperable with said seat and having a shank portion threaded to said stem for reciprocation thereby, and a cross-head guided by said arms and having an opening in which said shank portion is receivable and securable so as to prevent rotation of said needle with said stem, said cross-head substantially closing said passage above said port, the maximum diameter of said needle being less than the internal diameter of said ring.

2. A valve comprising a body having a through passage and a side port communicating with said passage, a cap closing the upper end of said passage, a non-rising stem rotatably carried by said cap, a depending arm having a neck portion threaded in said cap and surrounding said stem, said neck portion serving as a journal means for said stem, a valve seat carried by said arm and positioned between the lower end of said passage and said port, a needle cooperable with said seat and threaded to said stem for reciprocation thereby, and means in connection with said needle and in guided relation to said arm for preventing rotation of said needle with said stem, said means substantially closing said passage above said port.

3. A valve comprising a body having a through passage and a side port communicating with said passage, a cap closing the upper end of said passage, a non-rising stem rotatably carried by said cap, a depending arm having a neck portion threaded in said cap and surrounding said stem, said neck portion serving as a thrust member for said stem, a valve seat carried by said arm and positioned between the lower end of said passage and said port, a needle cooperable with said seat and threaded to said stem for reciprocation thereby, and means in connection with said needle and in guided relation to said arm for preventing rotation of said needle with said stem, said means substantially closing said passage above said port.

4. In a well head installation, the combination with a tubing supported in the well head and a shut-off valve at the upper end of the tubing, of control means for flow from the tubing comprising a body mounted above said shut-off valve having a straight through passage in alignment with and as large as the interior of the tubing and having a lateral flow port in communication with said passage, a part of said passage being below said port, a removable choke valve in said passage comprising an annular valve seat below said port, a needle cooperable with said seat, actuating means for moving said needle from and toward said seat operable through the upper end of said passage, and means for sealing the upper end of said passage when said choke valve is in place, said seat and needle being adapted by their relative position with respect to one another to control upward flow from the tubing through said port, said choke valve being removable as a unit from the upper end of said passage when the shut-off valve is closed, and connecting means at the upper end of said body for receiving a closure for said passage when said choke valve is removed, whereby unrestricted flow from the tubing to said port is permitted when said shut-off valve is opened.

5. In a well head installation, the combination with a tubing supported in the well head and a shut-off valve at the upper end of the tubing, of control means for flow from the tubing comprising a body mounted above said shut-off valve having a straight through passage in alignment with and as large as the interior of the tubing and having a lateral flow port in communication with said passage, a part of said passage being below said port, a removable choke valve in said passage comprising an annular valve seat below said port, a needle cooperable with said seat, actuating means for moving said needle longitudinally of said passage from and toward said seat, a plate in said passage above said port for maintaining said needle against rotation during said movement, said plate substantially closing said passage above said port, and means for sealing the upper end of said passage when said choke valve is in place, said seat and needle being adapted by their relative position with respect to one another to control upward flow from the tubing through said port, said choke valve being removable as a unit from the upper end of said passage when the shut-off valve is closed, and connecting means at the upper end of said body for receiving a fitting to receive and seal with a tool inserted into the tubing to perform operations therein when said shut-off valve is opened.

6. In a well head installation, the combination with a tubing supported in the well head and a shut-off valve at the upper end of the tubing, of control means for flow from the tubing comprising a body mounted above said shut-off valve having a straight through passage in alignment with and as large as the interior of the tubing and having a pair of lateral flow ports in communication with said passage, said body being equipped to connect with side flow lines from said ports or with closures for said ports, a part of said passage being below said ports, a removable choke valve in said passage comprising an annular valve seat below said ports, a needle cooperable with said seat, actuating means for moving said needle from and toward said seat operable through the upper end of said passage, and means for sealing the upper end of said passage when said choke valve is in place, said seat and needle being adapted by their relative position with respect to one another to control upward flow from the tubing through either or both of said ports, said choke valve being removable as a unit from the upper end of said passage when the shut-off valve is closed, and connecting means at the upper end of said body for receiving a closure for said passage when said choke valve is removed, whereby the flow through said passage is unrestricted and may be independently controlled in the side flow lines from either or both of said ports.

JOHN R. YANCEY.